June 28, 1966  YOSHIHISA MAITANI  3,257,922
DEVICE FOR SWINGING A REFLECTING MIRROR
IN A SINGLE-LENS REFLEX CAMERA
Filed Feb. 17, 1964  2 Sheets-Sheet 1
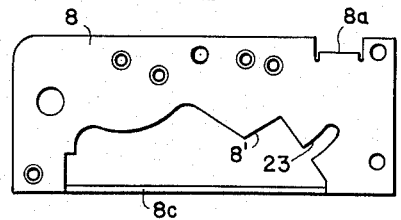
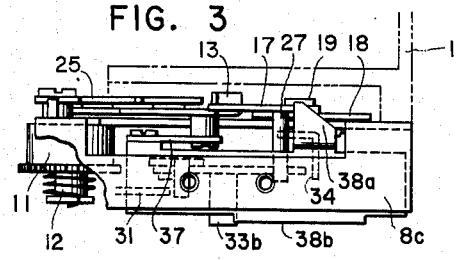
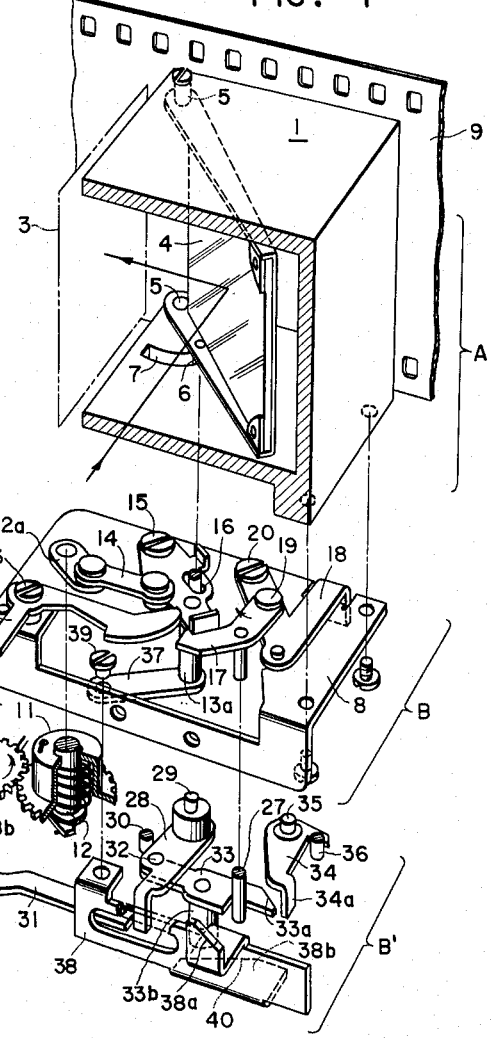
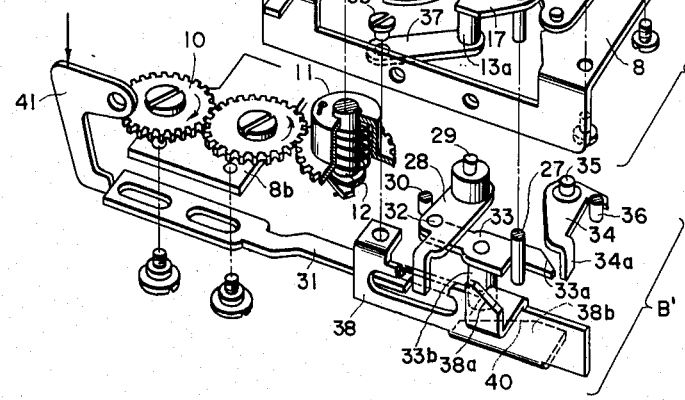

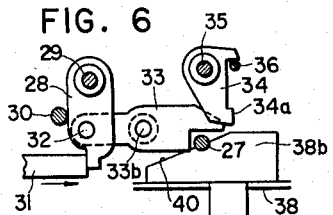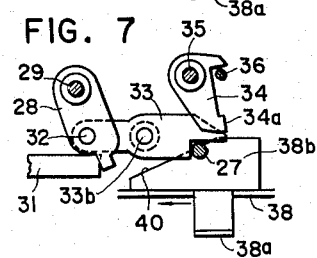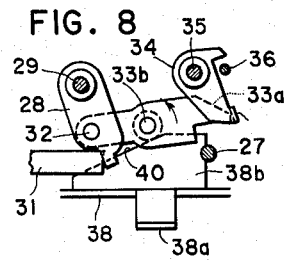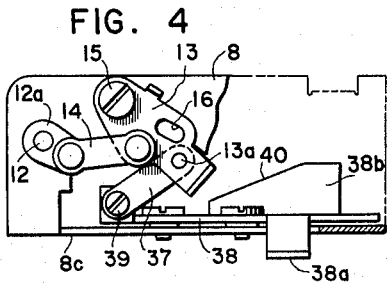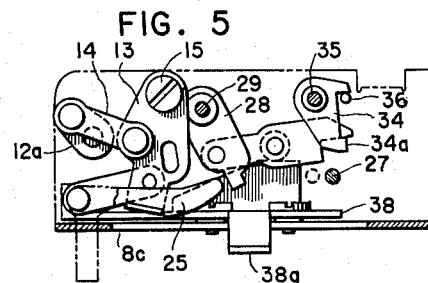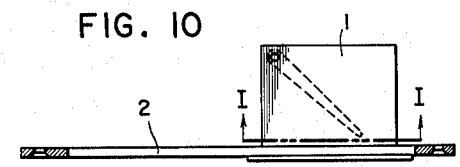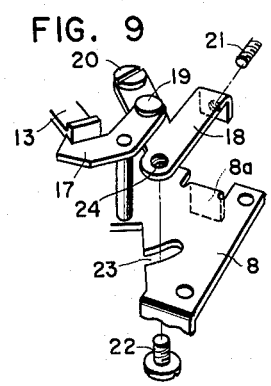

United States Patent Office

3,257,922
Patented June 28, 1966

3,257,922
DEVICE FOR SWINGING A REFLECTING MIRROR IN A SINGLE-LENS REFLEX CAMERA
Yoshihisa Maitani, Tokyo, Japan, assignor to Olympus Kogaku Kogyo Kabushiki-Kaisha, Tokyo, Japan
Filed Feb. 17, 1964, Ser. No. 345,295
Claims priority, application Japan, Feb. 19, 1963, 38/8,342
2 Claims. (Cl. 95—42)

This invention relates to a device for transversely swinging a movable reflecting mirror in a single-lens reflex camera of the type including a movable reflecting mirror disposed within a housing for the camera at an angle to an optical axis of a photographic objective to focus an object to be photographed onto a focussing plate longitudinally disposed within the housing, a reflecting optical system within the housing for upwardly reflecting an image thus formed, and an eyepiece disposed on the upper portion of the housing through which the image is viewed, the movable reflecting mirror being capable of transversely swinging about a longitudinal axis to swing out of the optical axis of the objective when an exposure is to be made.

In general, it has heretofore been the practice to provide a device for swinging a movable reflecting mirror, directly on a side wall of a mirror box in such a type of single-lens reflex camera. With the mirror box disposed within a camera housing transversely elongated, such a mirror box is formed separately from the housing and after a reflecting mirror and a device for swinging the same are mounted in the mirror box, the mirror box including therein the reflecting mirror and the swinging device is incorporated into the housing. However, in the single-lens reflex camera of the type wherein the reflecting mirror is transversely swung as previously described, the device for swinging the reflecting mirror is required to be mounted on the lower side of the mirror box. As a result, the swinging device will be naturally positioned below a lower mount secured to the housing. Thus it is impossible to first mount the swinging device directly on the lower side of the base plate of the mirror box and then to incorporate the assembly into the transversely elongated housing.

A general object of the invention is to provide for assembly of a single-lens reflex camera in a very simple manner.

Another object of the invention is to provide, in a single-lens reflex camera, a device for transversely swinging a movable reflecting mirror assembled on a single mounting plate in a unitary structure which can be, in turn, inserted into a housing for the camera from the lower side thereof to be rigidly secured to a bottom of a mirror box including therein the movable reflecting mirror.

According to the teachings of the invention there is provided a device for swinging a movable reflecting mirror in a single-lens reflex camera of the type including a transversely elongated housing wherein the reflecting mirror is disposed to swung transversely about a longitudinal axis, said device including a single mounting plate on the opposite faces of which all components required for effecting swinging of the reflecting mirror are mounted in a unitary structure. Then the unitary structure is disposed directly below a mirror box accommodating the reflecting mirror therein, on the lower side of the housing and rigidly secured to the lower side of the mirror box. The device as assembled includes a rockable arm operatively coupled to the lower end of the abovementioned longitudinal axis to effect movement equivalent to swinging movement of the reflecting mirror.

The invention will become more readily apparent from the following detailed description taken in conjunction with the accompanying drawings in which:

FIG. 1 is an exploded perspective view, partially in section, of a device constructed in accordance with the teachings of the invention;

FIG. 2 is a plan view of a mounting plate used in the device illustrated in FIG. 1;

FIG. 3 is a front view of the mounting plate illustrated in FIG. 2 with the required components mounted thereon;

FIG. 4 is a plan view of the movable components mounted on the mounting plate illustrated in FIGS. 2 and 3 with the mounting plate partially cut away;

FIG. 5 is a view similar to FIG. 4 but illustrating the movable components in relative positions different from those shown in FIG. 4;

FIGS. 6 through 8 are plan views of the mechanism illustrated in FIG. 1 in the lower and righthand portion and in different operating positions respectively;

FIG. 9 is an exploded perspective view of the mechanism illustrated in FIG. 1 in the middle and righthand portion; and FIG. 10 is a plan view of the front plate for a camera and a mirror box assembly secured thereto with the line I—I designating the reference line along which the mirror box assembly illustrated in FIG. 1 in the upper portion is cut.

Referring now to the drawings and more particularly to FIG. 1, there is illustrated an embodiment of the invention. The arrangement illustrated comprises a mirror box 1 accommodating a movable reflecting mirror in a single-lens reflex camera (not shown). The mirror box 1 is open on one side and substantially integral with a front plate 2 (see FIG. 10) which in turn is riveted or otherwise rigidly secured to a housing (not shown) for the camera. With the mirror box 1 assembled in the housing, a focussing plate 3 is positioned on the open side of the mirror box. Within the mirror box 1 a frame for carrying a movable reflecting mirror 4 is supported on a longitudinal axis 5 represented by a pair of aligned trunnions for laterally transverse swinging or rocking movement and includes an operating rod 6 depending from the same and loosely extending through an arcuate slot 7 formed in the bottom of the mirror box 1.

All components illustrated in FIG. 1 on the lowermost portion and generally designated by the reference character B' are arranged to be mounted on the lower side of a single mounting plate 8 (see FIG. 2) on which an assemblage illustrated in FIG. 1 in the middle portion and generally designated by the reference character B is mounted, in a manner as shown in FIG. 3. A mirror box assembly illustrated in FIG. 1 in the uppermost portion and generally designated by the reference character A and the front plate 2 substantially integral with the same are incorporated into a cast housing for the camera and then an operating mechanism for swinging the movable reflecting mirror of unitary structure (see FIG. 3) is disposed directly below the mirror box after which the mechanism is secured to the mirror box as by screws to form an integral structure.

One frame of a photographic film 9 loaded in the camera is fed in the transverse direction while simultaneously a gear 10 shown in FIG. 1 in the lower and lefthand portion is rotated in the direction of the arrow illustrated near the same. This rotational movement of the gear 10 is transmitted to a case 11 including therein a driving spiral spring for providing the energy for operating the movable reflecting mirror 4 with the result that the spring is put in its tensioned state. As shown in FIG. 3 a shaft 12 associated with the spring is journalled at the upper end portion on the mounting plate 8 for rotational movement and includes a crank arm 12a secured on that end thereof extending through the mounting plate. Therefore, the tensioned driving spring tends to rotate the crank arm 12a in the clockwise direction as viewed in FIG. 1. The crank arm 12a is operatively connected to a rockable arm 13 through a connecting member 14, the rockable arm being pivotably mounted on the mounting plate 8 at a pivot 15. The crank arm 12a and the rockable arm 13 are constructed and arranged such that one complete revolution of the crank arm 12a causes the rockable arm 13 to rock about the pivot 15 through a predetermined angle.

With the operating mechanism B secured on the bottom of the mirror box assembly A, the aforesaid pivot 15 is not required to be located on the extension of the longitudinal axis 5 of the movable reflecting mirror 4. However, the operating rod 6 depending from the mirror frame should have its lower end portion loosely inserted into an opening 16 formed in the rockable arm 13. If the pivot 15 is on the extension of the longitudinal axis 5 of the mirror, the opening may be circular in shape.

The rockable arm 13 has on its free end portion turned upwardly as viewed in FIG. 1 and adapted to engage a hook formed on a locking arm 17 which, in turn, is operatively connected to a V-shaped member 18 by a pivot pin 19. The locking arm 17 has a tendency to rotate about the pivot pin 19 in the clockwise direction as viewed in FIG. 1 until a control rod 27 extending downwardly from the arm abuts against an edge 8' of a notch formed in the mounting plate 8 (see FIG. 2). While the V-shaped member 18 should be made substantially integral with the mounting plate 8 it is preferred that it be adjustably secured on the mounting plate 8 in order to correct the position to which the mirror is tilted. More specifically the V-shaped member 18 is pivotally mounted at the end of one leg on the mounting plate 8 by a rivet 20 and has on the other end a downwardly extending portion with an adjusting screw 21 screwed thereinto (see FIG. 9). The adjusting screw 21 can be adjusted such that its inner end is moved with respect to the downwardly extending end portion of the V-shaped member 18 until the inner end of the screw abuts against a downwardly directed portion 8a on the mounting plate 8 whereby that surface of the photographic film 9 facing a photographic objective (not shown) and the image plane of the focusing plate 3 are a pair of conjugate surfaces with respect to the reflecting surface of the mirror 4. Thereafter a headed screw 22 is inserted into an arcuate slot-like notch 23 on the mounting plate 8 from the lower side thereof and then fastened in a threaded hole 24 formed on the bottom of the V-shaped member 18 (see FIG. 9) whereby the assembling and adjusting operations have been completed. Since the adjusting screw 21 is accessible through the rear side of the camera housing it will be appreciated that the adjustment just described can be effected in an extremely easy manner.

Further the mounting plate 8 is provided on its upper face with a bell crank 25 pivotably mounted thereon by a pivot rivet 26. The bell crank 25 has one leg end portion of spoon shape and is based so as to be rotated about the pivot 26 in the clockwise direction as viewed in FIGS. 1 and 5 by any suitable spring (not shown). A suitable stop (not shown) is provided for limiting the movement of the bell crank 25 which is normally in its position illustrated in FIG. 1. As previously described, the rod 27 depending from the locking arm 17 extends downwardly through the notch in the mounting plate 8 and projects beyond the lower face thereof.

Pivotably mounted on the lower face of the mounting plate 8 is a crank arm 28 on a pivot pin 29. The crank arm 28 is urged about the pivot pin 29 in the clockwise direction as viewed in FIG. 1, but the movement is limited by a stop 30. Thus the crank arm is normally in the position illustrated in FIG. 1. The arm has an end portion extending downwardly far enough to be capable of abutting against an actuating slide 31 at one end. The actuating slide 31 is slidably mounted on a plate portion 8b (see FIG. 1) substantially integral with the mounting plate 8. Pivotably mounted on the crank arm 28 by a pivot 32 is a floating piece 33 including a bevelled free end 33a and a pin 33b projecting downwardly beyond the same.

The floating piece 33 is weakly biased so as to be rotated about the pivot 32 in the clockwise direction as viewed in FIG. 1 and is normally in the position where a notch formed on the same adjacent the bevelled free end 33a engages the depending rod 27 of the locking arm 17 as shown in FIG. 1.

Further the mounting plate 8 has on the lower face a bell crank 34 pivotably mounted on a pivot pin 35 and including one end portion 34a positioned in a path which the bevelled end 33a is moved. The bell crank 34 is biased so as to be rotated about the pivot pin 35 in the clockwise direction as viewed in FIG. 1 and is normally in the position illustrated in the same figure and the other end thereof engages a stop 36.

Also the rockable arm 13 includes a downwardly directed pin 13a at the lower end of which one end of a connecting member 37 is pivotably mounted. The connecting member 37 has the other end pivotably mounted on an elongated control plate 38 on an ear thereof by a stepped screw 39. The control plate 38 is slidably mounted on an inner side of a skirt 8c projecting downwardly from the front edge of the mounting plate 8. The control plate 38 includes an L-shaped projection 38a formed on the upper edge of the same and associated with a diaphragm control (not shown), and an inwardly extending portion 38b extending below the mounting plate. The portion 38b includes an inner bevelled edge 40 adapted to cooperate with the depending pin 33b to rock the floating piece 33 as will be hereinafter described.

The operation of the arrangement thus far described will now be described. It is assumed that in FIG. 1 the driving spring in the case 11 for swinging the mirror 4 is in its tensioned state resulting from the feed movement of the photographic film 9. It is also assumed that the locking arm 17 prevents the energy stored in the rockable arm 13 due to tensioning of the driving spring from serving to rotate the arm 14 in the clockwise direction as viewed in FIG. 1 to thereby operate the movable reflecting mirror 4.

Under these assumed conditions, a releasing element 41 for operating a shutter mechanism (not shown) is manually subject to a pressure in the direction of the arrow illustrated in FIG. 1 to slide the actuating slide 31. The sliding movement of the slide 31 causes the depending rod 27 to move in the righthand direction as viewed in FIG. 6 against the crank arm 28 and the floating piece 33 until the rod reaches the position illustrated in FIG. 7. At that time the locking arm 17 disengages from the rockable arm 13 permitting the shaft 12 and the crank arm 12a to start to rotate in the clockwise direction under the action of the resilient force stored in the driving spring (see FIG. 4). The clockwise rotation of the shaft and crank arm is accompanied by clockwise rotation of the rockable arm 13 about the pivot 15 through the connecting member 14. When the shaft 12 has been rotated through approximately 180 degrees, the rockable arm 13 will reach the limit of clockwise rotational movement (see FIG. 5). During this movement of the arm 13 the free end of the same moves along the spoon-shaped edge of the end of one arm of the bell crank 25 in contacting relationship until it engages the shoulder formed on the side of the bell crank. In this way, the rockable arm 13 is moved to thereby completely swing the reflecting mirror 4 out of the optical axis of a photographic objective (not shown).

On the other hand, as the rockable arm 13 is rotated clockwise, the control plate 38 is pulled in the lefthand direction as viewed in FIG. 7 through the depending pin 13a and the connecting member 37. As shown in succession in FIGS. 7, 8 and 5, the bevelled edge 40 formed on the portion 38b of the control plate 38 advances in the lefthand direction to cause the depending pin 33b of the floating piece 33 to move along the bevelled edge to thereby rotate the floating piece about the pivot 32 in the counterclockwise direction as viewed in FIG. 8. Therefore, the bevelled end portion 33a pushes against the depending portion 34a of the bell crank 34 until the floating piece 33 is locked by the bell crank 34 through the engagement of the free end 33a with the depending portions 34a as shown in FIG. 5.

During the leftward movement of the control plate 38 the bent projection 38a integral with the same co-operates with a mechanism (not shown) to control an aperture of a diaphragm (not shown) and at the end of that leftward movement an appropriate portion of the control plate actuates a shutter (not shown). At the instant the shutter has been again closed after its opening operation, the same functions to push the tail end of the bell crank 25 in the direction of the arrow illustrated in FIG. 1 and against its tendency to thereby disengage the rockable arm 13 from the bell crank 25. This permits that portion of the force still remaining in the driving spring to be exerted on the shaft 12 to rotate in the same direction as when the mirror was swung out of the optical axis of the objective. Thus the rockable arm 13 is moved back in the counterclockwise direction through the crank arm 12a and the connecting member 14 whereby the free end of the arm 13 engages the locking arm 17 on the outer bevelled edge of the hook while the same passes over the pointed end of the locking arm until it again engages the hook on its inner side to return to its original position.

At the same time, the control plate 38 also slides rightwards to return to its original position. Then the releasing element 41 can be released to permit the crank arm 28 to rotate about its pivot 29 in the clockwise direction due to its tendency. Also the floating piece 33 will be rotated about its pivot 32 in the clockwise direction due to its tendency to disengage its free end from the end of the arm of the bell crank 34. Thus all the movable components will be returned to their original state.

It is to be noted that the floating piece 33 cooperates with the bevelled edge 40 formed on the control slide 38 to rotate about its pivot 32 until the free end of the floating piece 33 engages the bell crank 34 at the arm end. This action occurs for the following reasons. In order that the locking arm 17 disengaged from the rockable arm 13 engages the latter arm again, the turned end of the rockable arm 13 should engage the locking arm 17 on the outer bevelled edge of the hook as previously described. This requires that, immediately before the locking arm 17 engages the rockable arm 13 at the free end, the arm 17 should be slightly rotated about its pivot 19 in the counterclockwise direction as viewed in FIG. 1. Further once the rockable arm 13 has engaged the hook on the locking arm 17 the arm 17 must be slightly rotated in the clockwise direction. To this end, the depending rod 27 connected to the locking arm 17 is required to slightly move along with the arm 17. In this connection solid and dotted lines in FIG. 5 illustrate both positions occupied by the rod 27 at the limits of its displacement. More specifically, when the releasing element 41 is pushed the rod 27 is displaced to the position shown in solid line, whereas the rod occupies the position designated in dotted line when the rockable arm 13 engages the hook on the locking arm 17.

It is now assumed that on one hand the releasing element 41 is maintained in its rotated state and that on the other hand the floating piece 33 effects no tilting movement.

Then the relative position of the floating piece and the rod 27 is maintained as illustrated in FIG. 7. Therefore, the locking arm 17 is maintained in disengagement from the rocking arm 13. Under these circumstances, both the rockable arm 13 and the reflecting mirror 4 are repeatedly swung so long as the driving spring has the energy serving to effect such movement. In order to prevent the repeated operation of the rockable arm and the reflecting mirror, the rod 27 is required to be returned to its position designated in dotted line in FIG. 5 due to its tendency and through movement of the floating piece 33 immediately after the rod 27 has been displaced to its position illustrated in solid line in FIG. 5. As soon as the releasing element 41 has been released the floating piece 33 is returned to its original position illustrated in FIG. 6 as previously described.

From the foregoing it will be appreciated that the rockable arm 13 disposed on the mounting plate 8 is quite identical in movement with the frame for carrying the reflecting mirror 4. In other words, if the pivot 15 for the rockable arm 13 is positioned on the extension of the axis of rotation 5 of the mirror, the opening 16 may be of circular shape. If the pivot 15 is offset from the axis 5 for design purposes, the opening 16 is required only to be an arcuate slot.

Consequently the invention is very advantageous in that, the mechanism for operating the reflecting mirror is first assembled on the mounting plate in a unitary structure and then disposed directly below a mirror box for riveting. In this case, the ordinary components required for preparing a photographic camera itself can be separately incorporated into a housing for the camera. Thus the invention greatly facilitates mass production of single-lens reflex cameras using production lines.

What I claim is:

1. In a single lens reflex camera of the type having a transversely elongated housing wherein a movable reflecting mirror is mounted for swinging movement about a longitudinal axis, a device for swinging the movable reflecting mirror including a mirror box accommodating the movable reflecting mirror, a rockable arm on which the mirror is adapted to be mounted and having one end pivoted at the lower end of the longitudinal axis to effect swinging movement of the reflecting mirror, said rockable arm being mounted in said mirror box, a single mounting plate having all components required for effecting swinging movement of said reflecting mirror mounted on the opposite faces of said plate in a unitary structure, said unitary structure being rigidly mounted on said mirror box, and a single pin on said arm coupled to said components for effecting swinging movement.

2. A device as claimed in claim 1 in which said components include adjusting means for adjusting the position of said components and said pin for adjusting the position of said mirror relative to a focusing plate and a film.

References Cited by the Examiner

FOREIGN PATENTS 567,286 12/1923 France.
1,227,060 2/1960 France.

JOHN M. HORAN, *Primary Examiner.*